(12) United States Patent
Wren et al.

(10) Patent No.: US 7,542,949 B2
(45) Date of Patent: Jun. 2, 2009

(54) DETERMINING TEMPORAL PATTERNS IN SENSED DATA SEQUENCES BY HIERARCHICAL DECOMPOSITION OF HIDDEN MARKOV MODELS

(75) Inventors: Christopher R. Wren, Arlington, MA (US); David C. Minnen, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 399 days.

(21) Appl. No.: 10/843,994

(22) Filed: May 12, 2004

(65) Prior Publication Data

US 2005/0256817 A1  Nov. 17, 2005

(51) Int. Cl.
*G06N 3/08* (2006.01)
(52) U.S. Cl. .............................. 706/16; 706/21; 704/256
(58) Field of Classification Search ............. 706/12–22, 706/45; 708/1, 100, 160; 704/256
See application file for complete search history.

(56) References Cited

U.S. PATENT DOCUMENTS

| | | | | |
|---|---|---|---|---|
| 4,587,670 | A * | 5/1986 | Levinson et al. | 704/256 |
| 5,528,701 | A * | 6/1996 | Aref | 382/178 |
| 5,608,840 | A * | 3/1997 | Tsuboka | 704/236 |
| 5,634,087 | A * | 5/1997 | Mammone et al. | 706/25 |
| 5,638,489 | A * | 6/1997 | Tsuboka | 704/256 |
| 5,649,023 | A * | 7/1997 | Barbara et al. | 382/159 |
| 5,825,978 | A * | 10/1998 | Digalakis et al. | 704/256 |
| 5,857,169 | A * | 1/1999 | Seide | 704/256.7 |
| 5,912,989 | A * | 6/1999 | Watanabe | 382/228 |
| 6,324,510 | B1 * | 11/2001 | Waibel et al. | 704/256.7 |
| 7,139,688 | B2 * | 11/2006 | Aggarwal et al. | 703/2 |
| 7,203,635 | B2 * | 4/2007 | Oliver et al. | 703/22 |
| 2004/0267530 | A1 * | 12/2004 | He et al. | 704/256 |
| 2007/0005355 | A1 * | 1/2007 | Tian et al. | 704/237 |

OTHER PUBLICATIONS

Rabiner, Laurence; "A Tutorial on Hidden Markov Markov Models and Selected Applications in Speech Recognition", pp. 257-286.*

Smyth, Padhraic; "Clustering Sequences with Hidden Markov Models", pp. 1-7.*

Makris et al., "Automatic learning of an activity-based semantic scene model," *Proc. of IEEE Conference on Advanced Video and Signal Based Surveillance*, Jul. 2003.

Wang et al., "Unsupervised analysis of human gestures," *IEEE Pacific Rim Conference on Multimedia*, pp. 174-181, 2001.

(Continued)

*Primary Examiner*—David R Vincent
*Assistant Examiner*—Omar F Fernandez Rivas
(74) *Attorney, Agent, or Firm*—Dirk Brinkman; Gene Vinokaur

(57) ABSTRACT

A method determines temporal patterns in data sequences. A hierarchical tree of nodes is constructed. Each node in the tree is associated with a composite hidden Markov model, in which the composite hidden Markov model has one independent path for each child node of a parent node of the hierarchical tree. The composite hidden Markov models are trained using training data sequences. The composite hidden Markov models associated with the nodes of the hierarchical tree are decomposed into a single final composite Markov model. The single final composite hidden Markov model can then be employed for determining temporal patterns in unknown data sequences.

11 Claims, 4 Drawing Sheets

OTHER PUBLICATIONS

Chudova et al, "Sequential pattern discovery under a Markov assumption," Technical Report Feb. 2008, Information and Computer Science Dept., University of California, Irvine.

Smyth, "Clustering sequences with hidden Markov models," *Advances in Neural Information Processing Systems*, Mozer et al. Eds, The MIT Press, vol. 9, p. 648.

Alon et al., "Discovering clusters in motion time-series data," *Proceedings of the IEEE Conference on Computer Vision and Pattern Recognition*, pp. 375-381, 2003.

Toyama et al., "Wallflower: Principles and practice of background maintenance," *ICCV*, IEEE, pp. 255-261, 1999.

Makris, et al., "Automatic learning of an activity-based semantic scene model," *Proc. of IEEE Conference on Advanced Video and Signal Based Surveillance*, Jul. 2003.

Starner, et al., "Real-time American sign language recognition from video using hidden Markov models," *Proceedings of International Symposium on Computer Vision*, IEEE Computer Society Press, 1995.

Wang, et al., "Unsupervised analysis of human gestures," *IEEE Pacific Rim Conference on Multimedia*, pp. 174-181, 2001.

Chudova, et al, "Sequential pattern discovery under a Markov assumption," Technical Report Feb. 2008, Information and Computer Science Dept., University of California, Irvine.

Alon, et al., "Discovering clusters in motion time-series data," *Proceedings of the IEEE Conference on Computer Vision and Pattern Recognition*, pp. 375-381, 2003.

Toyama, et al., "Wallflower: Principles and practice of background maintenance," *ICCV*, IEEE, pp. 255-261, 1999.

Rabiner, "A tutorial on hidden Markov models and selected applications in speech recognition," *Proceedings of IEEE*, 77(2), pp. 257-285, 1989.

* cited by examiner

200

DETERMINING TEMPORAL PATTERNS IN SENSED DATA SEQUENCES BY HIERARCHICAL DECOMPOSITION OF HIDDEN MARKOV MODELS

FIELD OF THE INVENTION

The invention is generally related to data analysis, and more particularly to determining temporal patterns in large data sequences using hidden Markov models.

BACKGROUND OF THE INVENTION

It is common for sensed data sequences to have temporal patterns. For example, occupants of a building including sensors generate temporal patterns as they move from place to place. However, many automated systems used in buildings, e.g., elevator, heating, cooling, lighting, safety, and security systems, are largely insensitive to these patterns. Typically, these systems operate manually, in a simple pre-programmed day and night mode, or only respond to a current condition.

It is desired to determine temporal patterns in data sequences automatically.

Hidden Markov models (HMMs) have been used to represent patterns in data sequences, e.g., pedestrian flow Makris et al., "Automatic learning of an activity-based semantic scene model," *Proc. of IEEE Conference on Advanced Video and Signal Based Surveillance*, July 2003, hand gestures Starner et al., "Real-time American sign language recognition from video using hidden Markov models," *Proceedings of International Symposium on Computer Vision*, IEEE Computer Society Press 1995 and Wang et al., "Unsupervised analysis of human gestures," *IEEE Pacific Rim Conference on Multimedia*, pp. 174-181, 2001, DNA sequences, Chudova et al, "Sequential pattern discovery under a Markov assumption," Technical Report 02-08, Information and Computer Science Dept., University of California, Irvine, and human speech Rabiner, "A tutorial on hidden Markov models and selected applications in speech recognition," *Proceedings of IEEE*, 77(2), pp. 257-285, 1989.

Hidden Markov models provide a powerful tool for discovering temporal patterns in human motion data, gestural and otherwise. However, most prior art modeling methods are computationally complex and time-consuming.

SUMMARY OF THE INVENTION

The invention provides an unsupervised learning technique for determining temporal clusters in large data sets. The method performs a hierarchical decomposition of the data to determine a structure at many levels of detail and reduces the overall computational cost of pattern discovery.

A method determines temporal patterns in data sequences. A hierarchical tree of nodes is constructed. The tree can be a binary tree.

Each node in the tree is associated with a composite hidden Markov model, in which the composite hidden Markov model has one independent path for each child node of a parent node of the hierarchical tree. The models can be discrete or continuous.

The composite hidden Markov models are trained using training data sequences with labeled observations.

The composite hidden Markov models associated with the nodes of the hierarchical tree are decomposed into a single final composite hidden Markov model.

The single final composite hidden Markov model can then be employed for determining temporal patterns in unknown data sequences.

DETAILED DESCRIPTION OF THE PREFERRED EMBODIMENT

Figure 1:
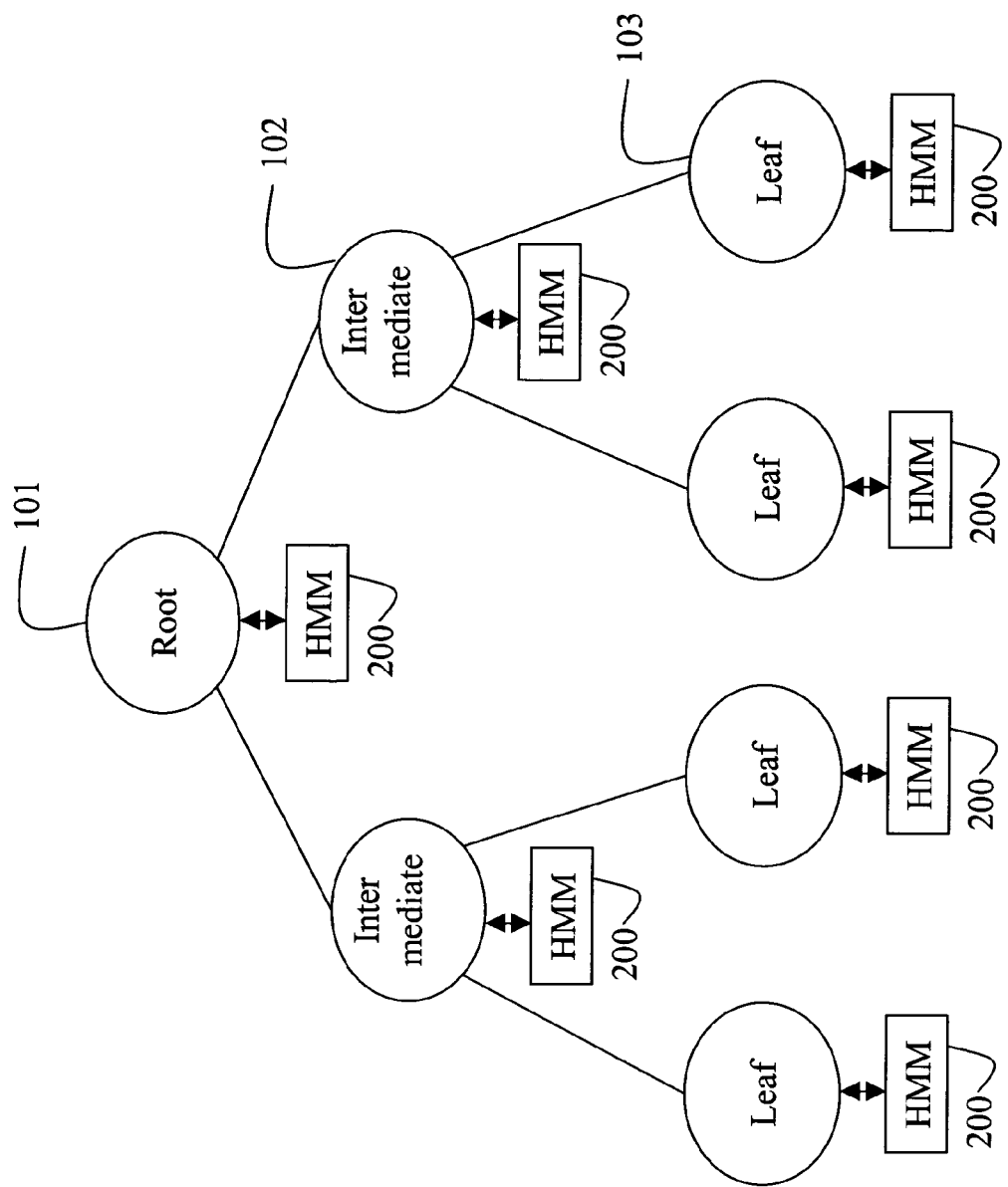
FIG. 1 is diagram of a hierarchical tree structure of nodes used by the method according to the invention.

As shown in FIG. 1, a basic structure for determining temporal patterns in data sequences to our invention is a hierarchical tree 100. The tree 100 includes a root node 101, intermediate nodes 102, and leaf nodes 103. The example tree 100 includes three levels of nodes. It should be understood that there can be any number of levels.

Each node is associated with a composite hidden Markov model (HMM) 200. The composite HMMs are obtained by clustering HMMs as described below.

Figure 2:
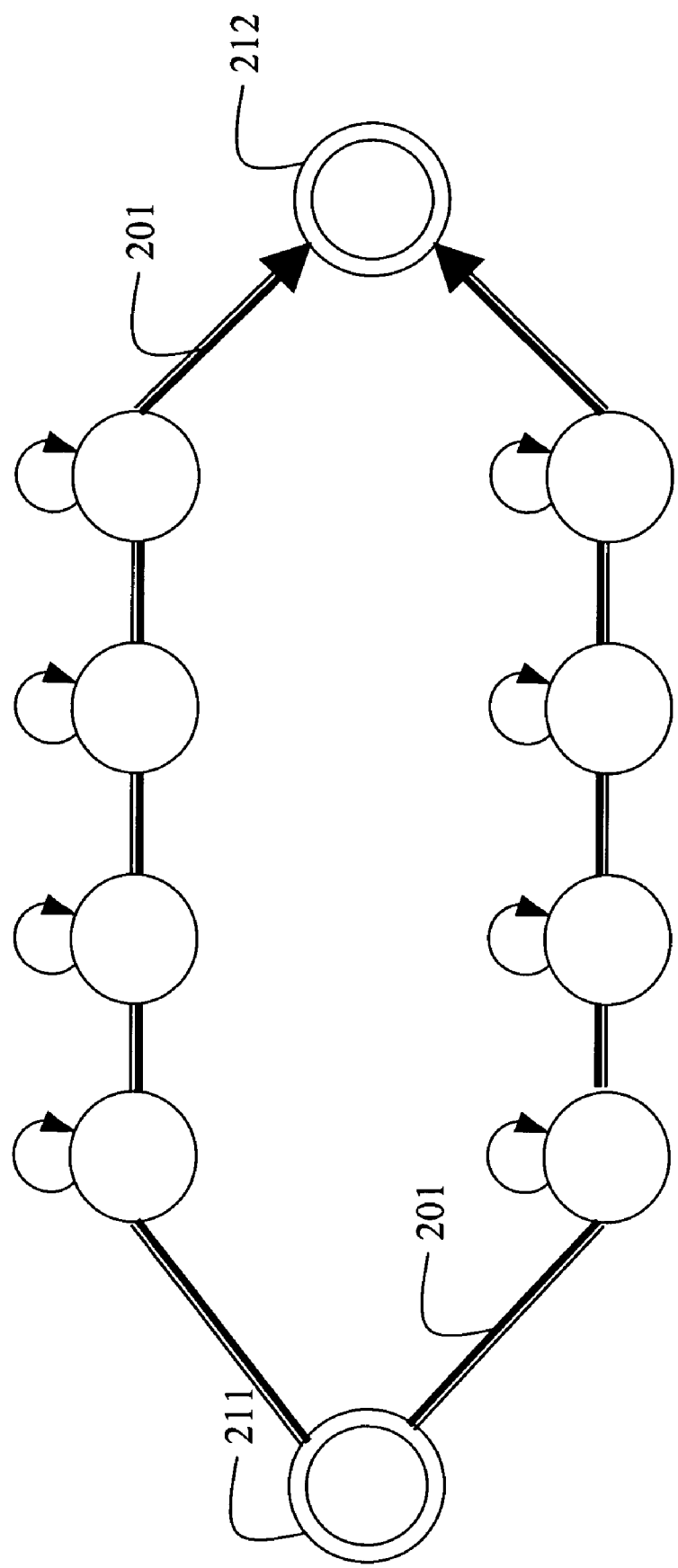
FIG. 2 is a diagram of a composite hidden Markov model associated with each node of the tree of FIG. 1.

As shown in FIG. 2, each composite HMM has one independent path 201 associated with each child node at a next lower level than the parent node in the tree 100. Herein, the example nodes are for 2-path composite HHM nodes. Therefore, the tree 100 is a binary tree. It should be understood that a parent node can have any practical number of child nodes. A start state 211 and an end state 212 of the composite HHM 200 are non-emitting.

To begin with, temporal data sequences are sensed or acquired in some known manner. Any number of methods or systems can be used. First, temporal patterns are learned from training data sequences using the composite HMMs. In the known training data sequences, observations are labeled. Then, the learned patterns can be used to determine temporal patterns in unknown data sequences during actual operation of a system or method.

Learning temporal patterns in the data sequences proceeds from the root node to the leaf nodes. Each data sequence is assigned to only a single subtree, specifically, the subtree associated with the single-path model that generates the data sequence with a maximum likelihood. In this way, the single-path models define the patterns in temporal data sequences. The method used to learn the path models from the temporal data sequences is described in detail below.

At the leave nodes of the tree, the N data sequences are therefore associated with the M hidden Markov models, where N is the total number of data sequences in a training set, and M/2 is the number of leaf nodes for a binary tree.

A single, low-complexity, low-path-count model is trained on the entire data set of N sequences at the root node. The M leaf models, which may be significantly more complex than the paths used at the root node, are trained only on a small subset of the data sequences. This is efficient because we do not need to evaluate the M models on each of the N training data sequences.

For the composite HMMs 200 that comprise the hierarchy of the tree 100, $P(O_i|\lambda^k_j)$ is a probability that the $i^{th}$ data sequence of observations, $O_i$, is generated by the $j^{th}$ model on the $k^{th}$ level of the hierarchy, which is parameterized by $\lambda^k_j$.

The parameter λ includes the conventional HMM parameters $\{\pi_m, T_{pq}, b_m\}$, where π represents the prior probabilities of states of the model, $T_{pq}$ is a transition matrix of state transition probabilities, and b is a parameterization of an output distribution.

Our method applies equally well to any model of the output distribution, including uni-modal Gaussian distributions over continuous data, and multi-nomial distributions over discrete data.

Composite HMMs

For the composite HMM 200 shown in FIG. 2, the transition matrix, $T_{pq}$, has a block diagonal component bracketed by sparse rows and columns. Each path model contributes a block of non-zero transition probabilities between intra-path states, while the inter-path transition probabilities are all zero. This composite HMM structure is described by Smyth, "Clustering sequences with hidden Markov models," *Advances in Neural Information Processing Systems*, Mozer et al. Eds, The MIT Press, Vol. 9, page 648. Smyth suggests learning the composite hidden Markov model in a two part process. Smyth does not describe the hierarchical decomposition according to this invention.

Agglomerative Clustering

The clustering is problematic because a natural distance metric between temporal patterns or between the parameters that define the models is unknown.

Therefore, a derived distance metric is used. A different HMM is trained for each sequence of training observations. Then, a distance between two observations $O_i$ and $O_j$ is measured by $$D(O_i, O_j) = \tfrac{1}{2}[p(O_j|\lambda_i) + p(O_i|\lambda_j)], \quad (1)$$

where $p(O_j|\lambda_j)$ is a probability of generating the $j^{th}$ observation from the $i^{th}$ model.

Intuitively, if two observations are similar, then the two models constructed and trained for the two observations are similar. That is, the model for one observation generates the other observation with a high likelihood.

A similar metric is described by Wang et at., "Unsupervised analysis of human gestures," *IEEE Pacific Rim Conference on Multimedia*, pp. 174-181, 2001. However, that distance metric is more complicated $$D(O_i, O_j) = \tfrac{1}{2}[1/T_i(P(O_i|\lambda_i) - P(O_i|\lambda_j)) + 1/T_j(P(O_j|\lambda_j) - P(O_j|\lambda_i))]. \quad (2)$$

Empirical tests indicate that the more complicated distance metric does not perform as well as the simpler distance metric used by the invention.

Figure 3:
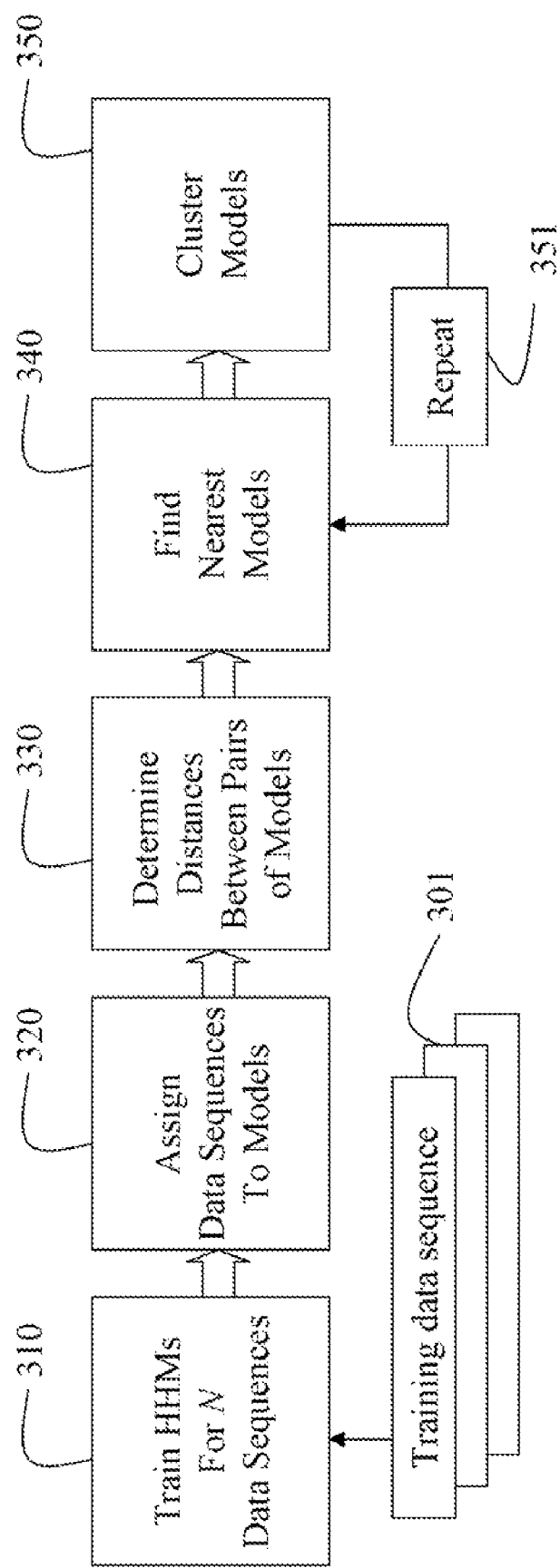
FIG. 3 is a flow diagram of a method for clustering according to the invention.

As shown in FIG. 3, agglomerative clustering 300 of models, given the distance metric of equation (1), proceeds as follows.

Train 310 one composite HMM 200 for each training data sequence 301. Assign 320 each observation to its own single-path model. Determine 330 a triangular matrix of distances between all pairs of path-models. Find 340 the two nearest path models, A, B such that A≠B.

Cluster 350 these two models as follows:

Update the distance matrix: D(i, A)=max(D(i, A), D(i, B)), for all models;

Remove the $B^{th}$ row and column from the distance matrix;

Record that these two models were clustered to form the hierarchy; and

If more than one model remains, then repeat 351 step 340, until one final composite model remains.

This procedure generates a full range of decompositions starting at N clusters of models for N data sequences, and ends with a single cluster defined by the composite hidden Markov model that describes the entire training set.

To determine the number of models to use, a separate analysis can be applied to this data structure to find a "natural break" in the clustering, i.e., a merge between significantly more distant models than the previous merge. Alternately, a predefined number of clusters of models can be selected. Smyth suggests selecting the desired number of clusters empirically by comparing generalization performance between composite HMMs with different numbers of paths.

Note that the distance between two models increases as the models become more similar. Thus, we use a negative log-likelihood for the probabilities in Equation 1.

Composite Model Construction and Refinement

After the temporal clustering completes, and the desired number of models is determined, the M selected path models are assembled into the larger composite hidden Markov model, with the structure described above. Each of these path HMMs represents a different underlying process as identified by the clustering process. However, these HMMs are trained after "hard" assignment, which means that each training observation is a member of exactly one composite HMM. It is known that in many cases "soft" assignment leads to better models due to similarity and ambiguity between classes, see Alon et al., "Discovering clusters in motion time-series data," *Proceedings of the IEEE Conference on Computer Vision and Pattern Recognition*, pp. 375-381, 2003.

To accomplish the soft re-estimation, the composite HMM is constructed and then retrained on all of the data using a Baum Welch re-estimation. Constructing the composite HMM is straightforward. Each HHM cluster becomes a distinct path through the composite HMM, leading from the common, non-emitting start state 211 to the common, non-emitting end state 212. This means that if each of the M cluster HMMs has s states, then the composite HMM has S=(M×s)+2 states, leading to an S×S transition matrix. The transition matrices of each path HMM are copied directly into the transition matrix of the composite HMM along the diagonal.

The prior state probabilities and final transition probabilities, i.e., the probability of exiting each path HMM, are then copied into the composite HMM and normalized. Finally, the observation distributions from the path HMMs are also copied into the corresponding states of the composite hidden Markov model.

After the composite model has been constructed, a modified Baum-Welch process is used to train the paths with soft observation assignments.

The conventional Baum-Welch algorithm requires on the order of $O(N \cdot S^2)$ per iteration, when the model has S states and is trained on N observations. Even though most of the state transitions are known to be zero, they still consume time to compute. Thus, training the composite model composed of M paths take at least $$\frac{N \cdot S^2}{N \cdot M \cdot s^2} = \frac{N \cdot (M \cdot s)^2}{N \cdot M \cdot s^2} = M \quad (3)$$

more time than training the path HMMs individually. Furthermore, the composite model requires almost certainly many more iterations to converge due to the extra parameters to estimate. This further increases the training time.

Hierarchical Tree of Composite HMMs

This invention embeds the above process into a hierarchical framework to improve its efficiency. Only the first stage, at the root 101 of the tree, vaguely resembles the Smyth process, except that the number of output models is always small, e.g. two for a binary tree. Furthermore, at this stage, we do not attempting to generate the final composite model as in Smyth. Instead, we generate just two models that separate the data into self-similar clusters that can be further decomposed. This means that the models at this stage can be kept much simpler than the final composite model according to the invention.

Because the computational time required for the Baum-Welch training is quadratic in the number of total states, for the composite models it is quadratic in both the number of paths and the number of states per path. Keeping the models simple and few is therefore very important at the root, where all the training data sequences are being considered. After model for the root node 101 is trained, then the training set is partitioned into smaller sets, e.g., one set including the training data sequences most likely to have been generated by the first path model, the second set including the training data sequences most likely to have been generated by the second path model, and so on. These smaller training sets are now analyzed in the same way, recursively.

At the intermediate nodes 102, the training set is smaller and more homogeneous than it was at the previous higher level. Because there is less data, it is possible to expand the model complexity to capture more subtle variations in the data sequences and still learn the models quickly.

At the leaf nodes 103 the training data sequences are spread out over a large number of leaves, further reducing the computational load to learn the final path models.

There are a number of conditions that can terminate the recursion, e.g., a maximum recursion depth. Individual node splits can also be evaluated. For example, if the training data sequence presented by a node is homogeneous, then the resulting partition is likely to be extremely uneven. This can indicate that an appropriate final composite model has been found.

Two factors motivate our use of hierarchical trees of composite HMMs according to the invention to automatically learn temporal patterns. First, compared to just the non-hierarchical composite model described above, a tree of HMMs requires less time to train. Second, the tree can potentially decompose the data more sensibly because each level only splits the data set into two parts rather than M separate clusters. For data sequences that exhibit natural divisions that match this model, an improvement in modeling performance and efficiency can be achieved.

A tree of composite HMMs according to the preferred embodiment of the invention is a binary tree, where each node contains a two-path HMM, see FIGS. 1 and 2. The purpose of the two HMMs is to model different temporal clusters or groups of clusters in the data set, thus dividing the data into two distinct parts. Each of these parts is then sent to the child node corresponding to the HMM that models the part the best. This continued bifurcation of the data set becomes fully decomposed at the bottom level leaf nodes 103 of the tree 100.

It is important to note that the tree of composite HMMs according to the invention is not a binary decision tree. Instead, the tree is a hierarchical model of all of the data sequences. Thus, the leaf nodes do not represent decisions, rather the leaf nodes form the final step in the decomposition of the data sequences into a distinct cluster of models.

Each node in the tree uses time proportional to $O(ns^2)$, where each HMM has s states, and each HHM is trained on n examples. Furthermore, the number of iterations needed for training to converge in each node is far lower than for just the prior art composite model. This contributes to faster training.

Alon et al. describe a more efficient process for training with soft assignments that is similar to the Baum-Welch algorithm, except that the probability of membership of each observation in each path is taken to be a hidden variable along with the typical hidden state memberships. Replacing the classical Baum-Welch implementation with this optimization significantly reduces the computational time required to train the models without the benefit of hierarchical decomposition.

However, empirical evidence clearly shows that for larger data sets the hierarchical decomposition is still significantly faster. Furthermore, the lack of a global soft-assignment retraining phase does not reduce the performance on many practical tasks, including those detailed below.

Evaluating the Model

One important question about the tree model according to the invention is how the tree, as a whole, assigns a probability (i.e., $p(O|\lambda)$) to a particular observation, where $\lambda$ represents the tree parameters. Three variations are possible.

$p(O|\lambda)$=probability of best leaf node.

In this variation, only the leaf nodes matter. Every composite HMM associated with a leaf node is evaluated for the given observation, and the highest probability is selected as the probability assigned by the tree.

$p(O|\lambda)$=probability of best path node.

In this variation, the nodes are selected by recursively traversing down the tree from the root to find the two HMMs in each node that models the given observation the best. In this variation, the model is a hierarchical decomposition within which the appropriate scale for the observation is unknown.

$p(O|\lambda)$=probability of best path leaf node.

This variation is similar to the previous variation. Here, however, the probability of the observation given to the tree is taken to be the probability assigned by the HMM of the leaf node.

Empirical testing indicates that for certain data sets, the leaf models generalize better than the internal decision variations.

Pedestrian Flow Data

The invention can be used to determine macroscopic gestures as people move about in an office building. Significant prior art work has studied manual gestures and facial motions, but only recently have computational and perceptual processes been used to study the macroscopic behaviors people exhibit as they move about large areas, such as office buildings.

Because these gestures are not overtly communicative, they do not fit into the standard conceptual frameworks relied on when modeling manual gestures, see McNeill, "*Hand and Mind: What Gestures Reveal about Thought*," The University of Chicago Press, 1992.

Therefore, it is necessary to consider data-driven models for these gestures to expose the temporal patterns hidden in the data. Our method is suited uniquely for discovering temporal patterns in large data sets that are required to capture diverse people behavior observed in large areas.

In this application, the data sequences comprise readings taken from motion detectors that observe areas in an office building. The motion detectors are configured as cameras running background subtraction and primitive motion detection processes, see Toyama et al., "Wallflower: Principles and practice of background maintenance," *ICCV*, IEEE, pp 255-261, 1999.

The raw data set is very large with about 13.5 million observations. About 2.7 million observations, which include at least one moving person in the area, are used for training.

For training, the 17-dimensional binary values, with $2^{17}$ possible states, are spatially clustered and labeled, for example, "a person approaching the elevator," and "a person pushing an elevator call button." Two trees are learned, one for a positive class and the other for a negative class. The outputs of the two trees are compared with a likelihood ratio test.

Figure 4:
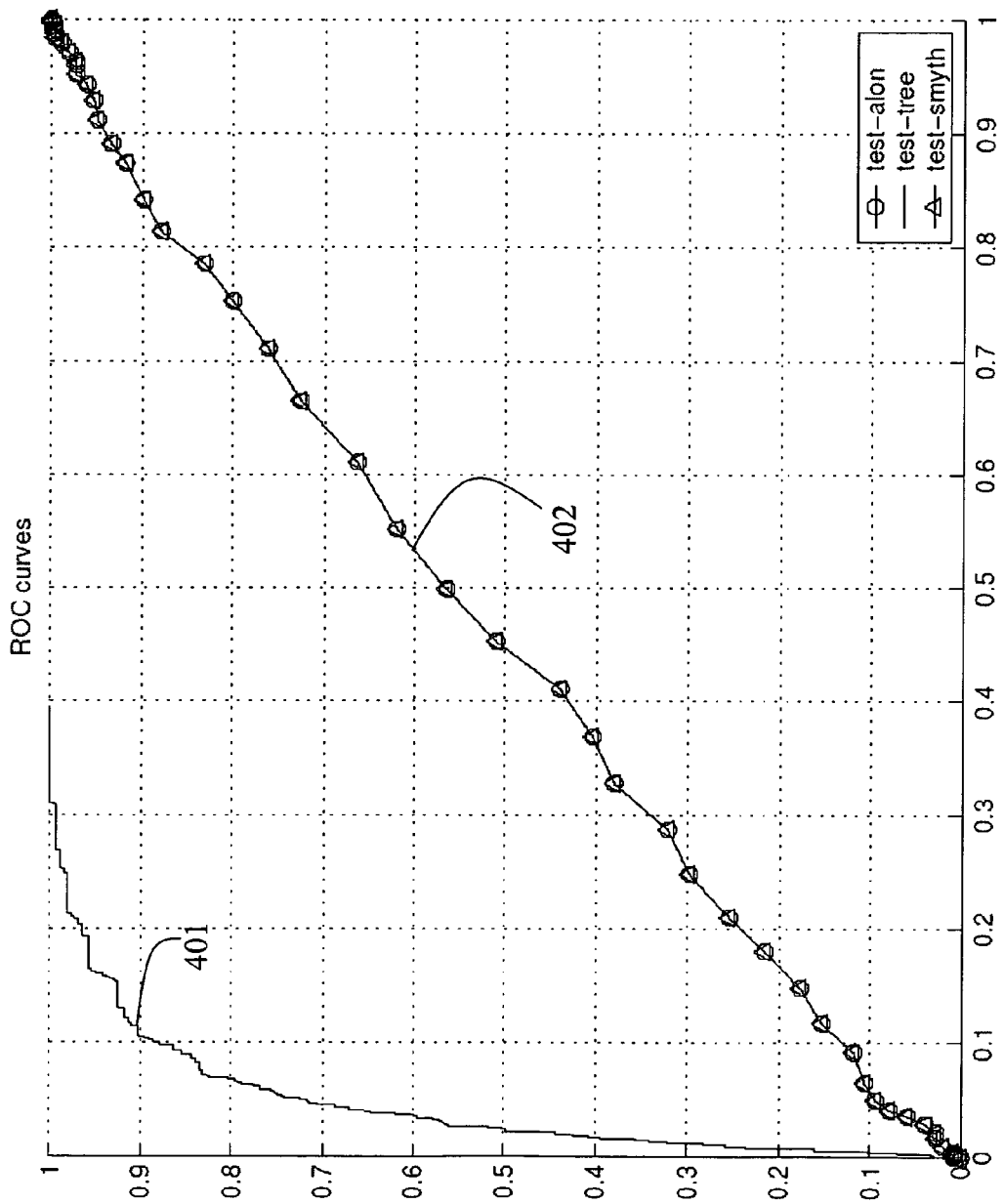
FIG. 4 is a graph of ROC curves comparing results of prior art classifiers with the classification according to the invention.

FIG. 4 compares the performance results for the classifiers on the pedestrian flow data for the tree method 401 according to the invention with the prior art Smyth and Alon methods 402. The comparison is in a form of receiver operating characteristic (ROC) curves. In applications where the data have a natural hierarchy that matches the structure of our tree model, we expect superior performance.

EFFECT OF THE INVENTION

The invention provides a method for discovering temporal patterns in large data sets. The method decomposes hierarchically data into smaller, self-similar portions. A gain in efficiency is attained without sacrificing a significant classification performance.

The method according to the invention makes a series of binary decompositions of the data during a learning process and learns temporal clusters at leaf nodes of a resulting tree. This approach enables the invention to discover large numbers of clusters in large data sets without the need to evaluate every sequence with every leaf model.

It is also be possible to use the decomposition method according to the invention as a more efficient initialization step, and then to use traditional methods to gain the benefits of clustering with global soft assignment.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer-implemented method for controlling operations of a system in an environment using temporal patterns in data sequences, comprising:

constructing a hierarchical tree of nodes, the hierarchical tree of nodes including a root node, a plurality of intermediate nodes, and a plurality of leaf nodes, and in which the root node has a plurality of child nodes, each intermediate node has a parent node and a plurality of child nodes, and each leaf node has a parent node;

associating each node with a composite hidden Markov model, in which each composite hidden Markov model associated with the root node or an intermediate node has one independent path model corresponding to each child node of the node, and in which each composite hidden Markov model associated with a leaf node has a plurality of independent final path models;

acquiring a set of training data sequences representing known temporal patterns of motion of physical objects in an environment;

training the composite hidden Markov models using the set of training data sequences, in which the training further comprises:

training the composite hidden Markov model associated with the root node with the set of training data sequences;

training the composite hidden Markov models associated with each intermediate node with intermediate subsets of the set of training data sequences, each intermediate subset of the set of training data sequences including a training data sequence generated by the corresponding independent path model of the parent node of the intermediate node; and training the composite hidden Markov model associated with each leaf node with leaf subsets of the set of training data sequences to produce a plurality of trained final path models, each leaf subset of the set of training data sequences including a training data sequence generated by the corresponding independent path model of the parent node of the leaf node;

constructing a single final composite hidden Markov model, in which the single final composite hidden Markov model has one independent path model for each trained final path model;

acquiring unknown data sequences representing unknown temporal patterns of motion of physical objects in the environment;

employing the single final composite hidden Markov model to determine known temporal patterns in the unknown data sequences; and controlling operations of a system in the environment using the determined known temporal patterns.

2. The computer-implemented method of claim 1, in which a start state and an end state of each composite hidden Markov model are non-emitting.

3. The computer-implemented method of claim 1, in which each composite hidden Markov model has two independent path models, and the hierarchical tree is a binary tree.

4. The computer-implemented method of claim 1, in which each composite hidden Markov model associated with a leaf node of the hierarchical tree is trained by only one training data sequence.

5. The computer-implemented method of claim 1, further comprising:

parameterizing each composite hidden Markov model by $\lambda^k_j$, where $\lambda^k_j$ includes conventional hidden Markov model parameters $\{\pi_m, T_{pq}, b_m\}$, $\pi_m$ represents prior probabilities for states of the composite hidden Markov model, $T_{pq}$ is a transition matrix of state transition probabilities, and $b_m$ is a parameterization of an output distribution of the composite hidden Markov model, and in which each composite hidden Markov model has a probability $P(O_i|\lambda^k_j)$ that an $i^{th}$ data sequence of observations $O_i$ is generated by a $j^{th}$ composite hidden Markov model on a $k^{th}$ level of the tree.

6. The computer-implemented method of claim 1, in which the training data sequences are continuous, and the composite hidden Markov models are represented by uni-modal Gaussian distributions.

7. The computer-implemented method of claim 1, in which the training data sequences are discrete, and the composite hidden Markov models are represented by multi-nomial distributions.

8. The computer-implemented method of claim 5, in which the transition matrix, $T_{pq}$, is a block diagonal matrix, and each independent path model contributes a block of non-zero transition probabilities between states within the independent path model, while transition probabilities between states of different independent path models are all zero.

9. The computer-implemented method of claim 5, in which a distance between two observations, $O_i$ and $O_j$ of the data sequences is measured by $D(O_i, O_j) = \frac{1}{2}[p(O_j|\lambda_i) + p(O_i|\lambda_j)]$, where $p(O_j|\lambda_i)$ is a probability of generating a $J^{th}$ observation from an $i^{th}$ composite hidden Markov model, and where $p(O_i|\lambda_j)$ is a probability of generating an $i^{th}$ observation from an $j^{th}$ composite hidden Markov model.

10. The computer-implemented method of claim 1, further comprising:

retraining the single final composite hidden Markov model using all of the training data sequences.

11. The computer-implemented method of claim 1, in which the single final composite hidden Markov model has one independent path model for each trained independent path model associated with a set of intermediate nodes.

\* \* \* \* \*